UNITED STATES PATENT OFFICE.

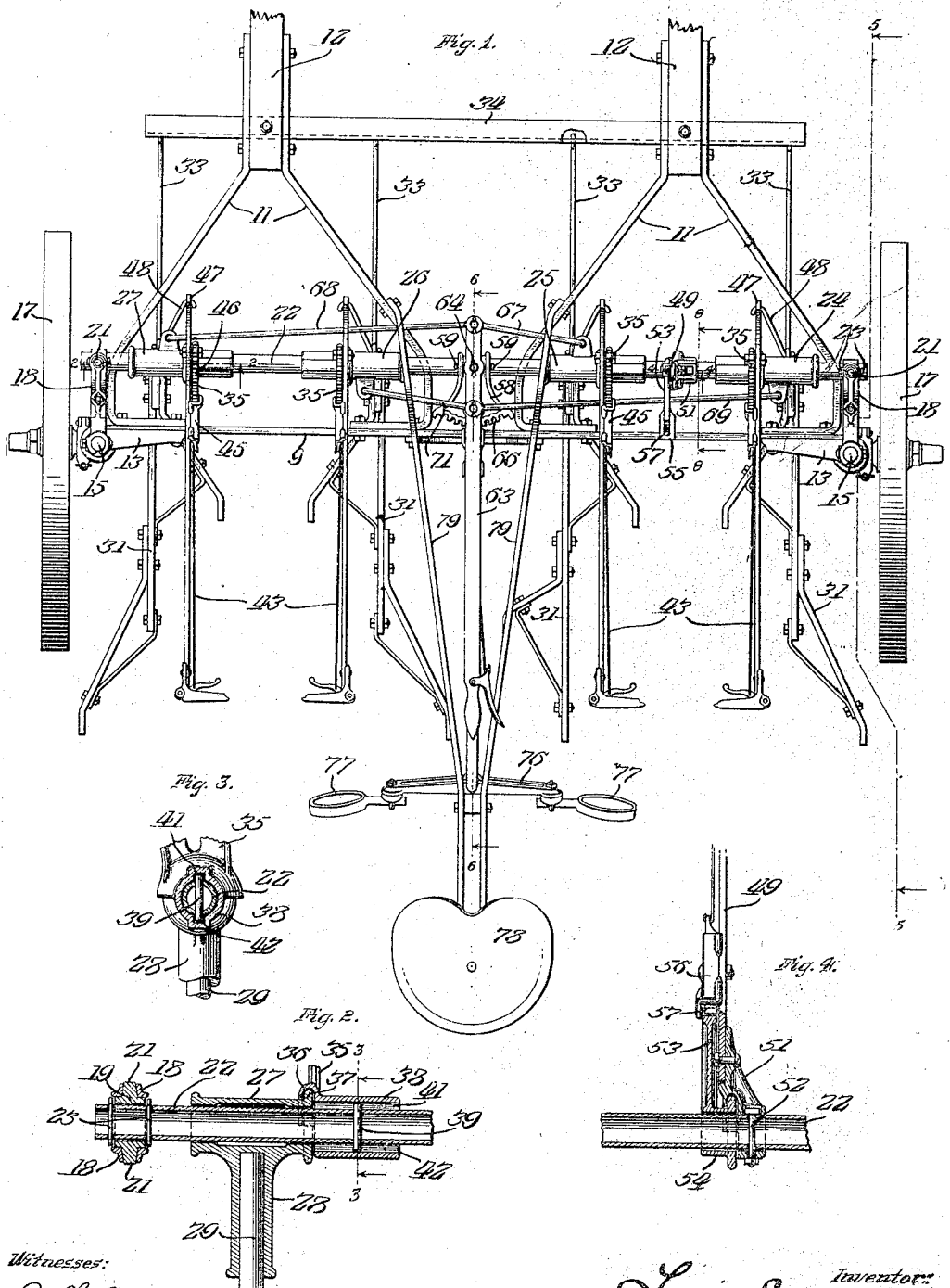

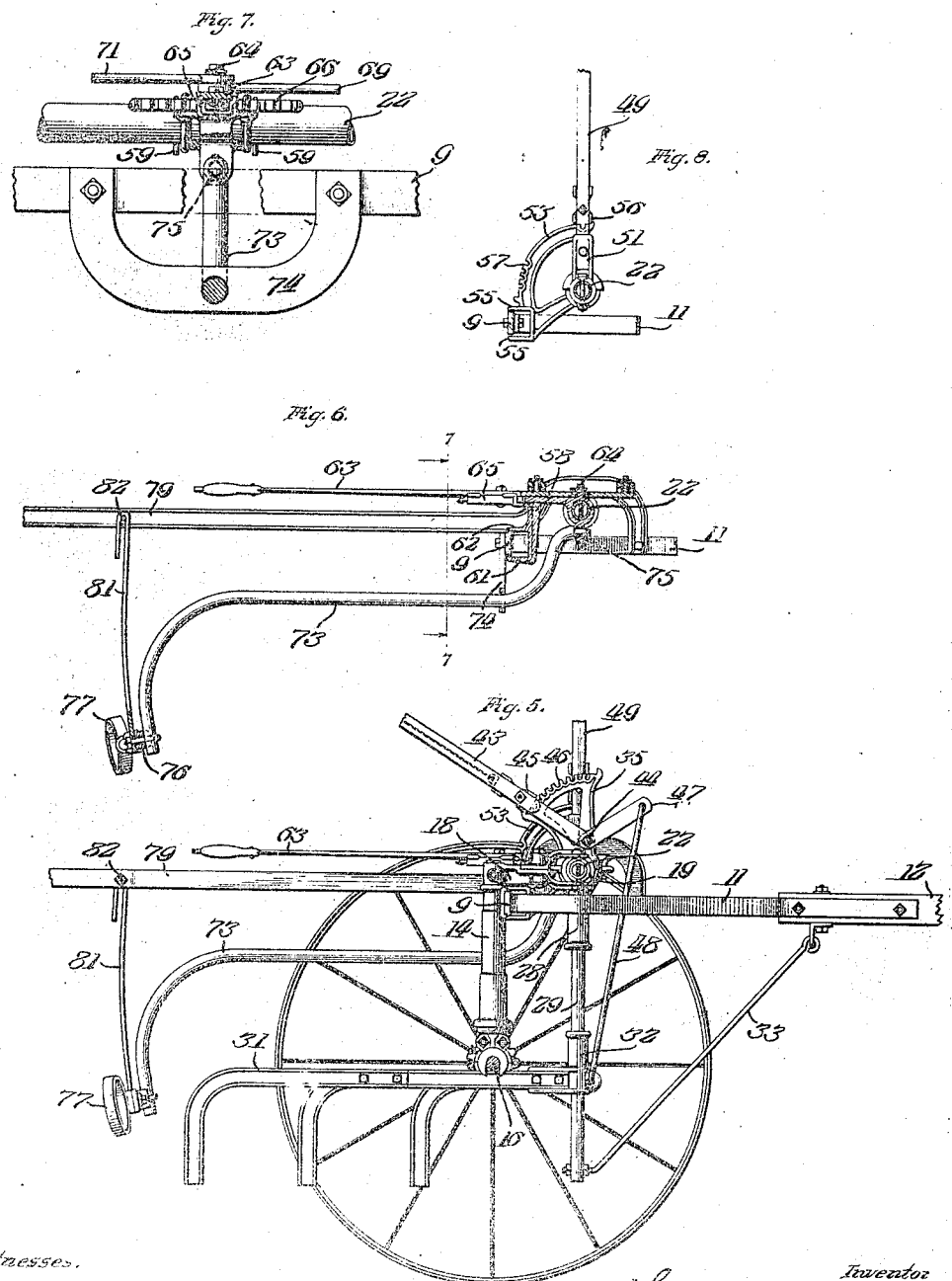

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

TWO-ROW CULTIVATOR.

1,137,935.  Specification of Letters Patent.  Patented May 4, 1915.

Application filed May 25, 1914. Serial No. 840,878.

*To all whom it may concern:*

Be it known that I, LEWIS E. WATERMAN, a citizen of the United States, residing at Rockford, in the county of Winnebago and State of Illinois, have invented certain new and useful Improvements in Two-Row Cultivators, of which the following is a specification.

This invention pertains in general to the art of cultivators and has more particular reference to riding cultivators intended for use in cultivating corn or other crops which are planted in rows, the embodiment of my invention, shown for illustration in the present instance, being adapted to simultaneously cultivate two rows, although it will be obvious as the invention is better understood that the principles of the invention might be incorporated in either a single or multi-row cultivator.

One of the primary objects of this invention is to provide a cultivator which will be light and at the same time strong and durable and which will be so flexible and easy to manipulate that it will readily respond to guiding movements of the operator, and can be shifted and controlled with a minimum expenditure of energy.

More specifically my invention has for one of its objects the provision of a cultivator embodying improved means for shifting all of the beams laterally and simultaneously angling the wheels in a corresponding direction.

Another object is to provide simple and efficient mechanism whereby the beams may be individually adjusted to cultivate at various depths and may be simultaneously raised or lowered by the simple manipulation of a single manually controlled lever.

A further object is to provide novel and improved mechanism for adjusting the beams laterally to vary the distance between the beams of each pair and for maintaining the beams in their adjusted positions.

Additional objects and many of the inherent advantages of the invention will be readily apparent as the same becomes better understood by reference to the following description when considered in connection with the accompanying drawings.

Referring to the drawings—Figure 1 is a plan view of a cultivator embodying my invention; Fig. 2 is a fragmentary sectional view on the line 2—2 of Fig. 1; Fig. 3 is a transverse sectional view on the line 3—3 of Fig. 2; Fig. 4 is a fragmentary sectional view on the line 4—4 of Fig. 1; Figs. 5 and 6 are transverse sectional views taken on the lines 5—5 and 6—6 respectively of Fig. 1; Fig. 7 is a fragmentary elevation partially in section of the mechanism for adjusting the beams laterally with respect to each other, and Fig. 8 is a fragmentary sectional view taken on the line 8—8 of Fig. 1.

From an inspection of the drawings it will be apparent that the main frame of the machine comprises a transverse member 9 to which two pairs of shaped frame members 11 are rigidly bolted at their rear inturned ends, the outer ends of each pair of members 11 being bolted or otherwise rigidly secured to the opposite faces of the rear ends of the poles or tongues 12, to which the horses are attached.

To each side of the frame thus formed I have fixedly attached a standard member or bracket 13 shaped to provide a vertically disposed sleeve or journal 14 in which the vertical portion 15 of an L-shaped axle member is pivotally mounted, the horizontal portion 16 of the axle members forming the axles for a pair of supporting wheels 17 which are mounted thereon. Upon the upper end of each vertical portion 15 of the axle members is rigidly mounted an arm 18 which extends forwardly from its respective vertical portion 15, the arms 18 being disposed parallel with each other and with the wheels.

Referring now more particularly to Figs. 1 and 2, it will be observed that the forward extremities of the arms 18 are each forked to accommodate a sleeve 19 which is pivotally connected with its respective arm, the pivotal connection being effected by oppositely projecting studs 21 formed on the sleeve and seated in corresponding bearings formed in the prongs of the member 18. The arms 18 and, consequently, the wheels 17 are maintained in parallel relation by a transversely disposed shaft 22 journaled in each sleeve 19 and maintained against longitudinal movement with respect to these sleeves by means of pairs of pins 23 inserted through the shaft on opposite sides of each sleeve. It will be obvious that longitudinal movement of the shaft will simultaneously angle both of the wheels about their vertical axes and maintain the wheels in parallel relation.

A plurality of sleeves 24, 25, 26 and 27 respectively (Fig. 1), one for each of the cultivator beams, are each loosely mounted upon the shaft 22 and provided with a downwardly disposed socket 28 in which the upper end of a post 29 is rigidly secured. The posts are therefore suspended from and supported by the shaft 22. The cultivator beams, designated by reference character 31, are each equipped at their forward ends with a vertically disposed sleeve 32 slidably mounted upon one of the posts 29 so that the beams may be moved vertically on the post to raise and lower the shovels or other cultivating tools (not shown) carried by the beams. Since the sleeves 32 are rigidly attached to the beams 31 it will be obvious that the sleeves will maintain the beams in substantially horizontal position, as shown in Fig. 5. In order to prevent the posts from swinging about the shaft 22 I have provided a series of braces 33, each of which is bolted at its lower end to a post 29 and is attached at its upper end to a transversely disposed bar or angle member 34 bolted or otherwise fixedly secured to the poles 12. These braces hold the posts substantially rigidly in a vertical position, thereby insuring a horizontal position of the beams 31.

The beams are adjusted vertically on the posts 29 and are held in adjusted position by individual adjusting mechanisms which will now be described, and since all of the mechanisms are substantially identical a detailed description of one will suffice for an understanding of the invention.

Referring now to Figs. 1, 2, 3 and 5, it will be observed that a sector member 35 is mounted upon the shaft adjacent to each sleeve 27 and is provided with an overhanging portion 36 which engages with a flange 37 formed on the sleeve 27 so that the sleeve portion 38 of the sector member is held against longitudinal movement relatively to the sleeve 27. The sleeve 38 and, consequently, the sector member are maintained against rotative movement relatively to the shaft 22 by means of a pin 39 extending through the shaft into oppositely disposed grooves 41 and 42 formed on the interior of sleeve 38, as shown in Figs. 2 and 3. A hand lever 43 is pivotally mounted upon a bolt 44 to each sector member 35, the longer arm of the lever being equipped with a manually controlled latch 45, of any preferred construction, adapted to engage with the notches 46 in the sector member to hold said lever in adjusted position. The shorter arm 47 of the lever is connected with the sleeve 32 by a connecting rod 48 so that said sleeve and the beam carried thereby are raised or lowered as the lever is moved in one direction or the other about its pivot. Since each of the beams is connected with a similar adjusting lever it will be obvious that the beams may be individually raised or lowered and retained in adjusted position by means of the individual adjusting levers described.

In practice the beams are set to the required depth by means of the individual adjusting levers and are then left in this adjusted position while the raising and lowering of all of the beams from operative to inoperative position and vice versa are accomplished by means of a single raising and lowering lever, which will now be described.

Referring to Figs. 1, 4 and 8, it will be observed that a lever 49 is carried by a base 51 which in turn is immovably secured to the shaft 22 by a bolt 52. A coöperating sector member 53 is formed to provide a sleeve 54 which loosely embraces the shaft 52 but is held against rotation with said shaft by means of rearwardly extending prongs 55 which slidingly engage with the top and bottom of the transverse frame member 9. The lever 49 is equipped with a manually operable latch 56 adapted to engage in notches 57 formed in the sector member 53, whereby said lever is retained in adjusted position. Assuming that the lever 49 is in the position shown in Fig. 8 the beams will be in lowered position for the reason that the sector members 35 and levers 43 will be positioned as shown in Fig. 5. In order to raise the beams the lever 49 is swung from the position shown in Figs. 5 and 8 rearwardly or in a counter-clockwise direction, thereby rotating the shaft 22 and the sector members 35 and levers 43 carried thereby to elevate the extremity of the lever arms 47 and thereby lift the beams. It will be manifest therefore that the beams may be raised and lowered individually by the levers 43, and raised and lowered collectively by the lever 49.

For the purpose of adjusting the beams longitudinally of the shaft 22 to position the beams of each pair closer together or farther apart I have provided mechanism, best shown in Figs. 1, 6 and 7, which comprises a sector member 58 loosely sleeved on the shaft 22, as shown in Fig. 6, but held against longitudinal movement relative to the shaft by means of pins 59 projecting through the shaft at each end of the sleeve. The sector member is held against rotary movement with the shaft by a pair of rigid fingers 61 and 62 positioned to slidingly engage the bottom and top respectively of the frame member 9. An adjusting lever 63 is pivoted upon a stud 64 projecting upwardly from the sector sleeve and is equipped with a manually controlled latch 65, of any approved construction, which is adapted to engage in the notches 66 of the sector member to hold the lever in adjusted position. The sleeves 25 and 27 are respectively connected with the forward extremity of lever 63 by links 67 and 68 while sleeves 24 and 26 are connected with the lever at the opposite side of its fulcrum by similar links 69 and 71. Viewing Fig. 1 it will be obvious that when the rear end of lever 63 is swung to the right the individual beams of each pair will be moved apart and when said lever is moved in the opposite direction the beams of each pair will be moved closer together. The beams are retained in their adjusted position by the lever 63 through interlocking engagement of the latch 65 with the sector member 58. Since the sector member 58 and the lever 63 are carried by the shaft 22 and are held against movement longitudinally of the shaft it will be obvious that longitudinal movements of the shaft to angle the wheels will shift the beams laterally all together without disturbing or affecting the spacing of the beams with relation to each other.

The shaft 22 is moved longitudinally to angle the wheels and shift the beams by means of a lever 73 pivoted in a bracket 74 fixed on the main frame member 9, said lever being pivotally connected at 75 with the sleeve of the sector member 58 and being provided at its opposite downturned end with a crossbar 76 equipped with stirrups 77. The seat 78, upon which the operator sits, is carried by a pair of bars 79 bolted at their forward ends to the inner members 11 and resting upon the frame member 9. The rear end of shifting lever 73 is supported from the seat bars by a link 81 hooked over the bolt 82 extending between the seat bars. The seat is rigid with the main frame and when the operator pushes laterally with his feet in the stirrups 77 the lever 73 is swung laterally about its pivot in the bracket 74 to thereby move the shaft 22 longitudinally, which movement, as has been previously described, shifts the beams laterally and simultaneously angles the wheels.

It is believed that my invention and its mode of operation will be readily understood from the foregoing without further description, and since various other modified forms may be made without departing from the spirit of this invention I do not wish to confine myself to the exact embodiment shown and described, but wish to claim all such modified forms as would come properly within the general scope of the invention as set forth in the following claims.

I claim:

1. In a cultivator, the combination of a pair of wheels mounted to swing upon vertical axes, means connecting said wheels whereby the wheels are swung about their vertical axes and maintained in parallel relation, a plurality of beams carried by said means, means carried by and movable with respect to said wheel-connecting means for lifting and lowering said beams individually, and means for operating said beam-operating means collectively for raising and lowering the beams in unison.

2. In a cultivator, the combination of a pair of wheels mounted to swing about vertical axes, a longitudinally movable shaft connecting said wheels whereby the wheels may be angled and are maintained in parallel relation, a plurality of beams supported from said shaft, devices mounted upon and movable with respect to said shaft for raising and lowering the beams individually, and means for locking said device fixed with respect to said shaft and for rocking the shaft to simultaneously raise or lower all of said beams.

3. In a cultivator, the combination of a pair of wheels pivoted to shift about vertical axes, an arm rigid with the axle of each wheel and projecting forwardly from the vertical axes, a shaft pivotally connected with the extremity of each of said arms whereby the wheels are maintained in parallel relation, means for moving said shaft longitudinally to angle the wheels, beams supported from said shaft, a plurality of pivotally mounted hand levers, each connected with one of said beams, whereby the beams are raised and lowered individually, and a lever fixed to said shaft whereby the shaft may be rotated to raise or lower all of said beams simultaneously.

4. In a cultivator, the combination of a pair of wheels pivoted to swing about vertical axes, a shaft connecting said wheels, a post suspended from said shaft, a beam pivoted on said post, and an operating handle connected with said beam whereby the beam may be moved up and down on said post.

5. In a cultivator, the combination of a transversely extending shaft, a plurality of posts suspended from said shaft, a cultivator beam slidably and pivotally associated with each of said posts, pivotally mounted operating levers supported by said shaft, and connections between said levers and said beams whereby the beams may be moved vertically on said posts.

6. In a cultivator, the combination of a shaft, posts suspended from said shaft, beams slidably associated with said posts, sector members mounted on said shaft, an operating lever pivoted on each sector member, connections between said levers and said beams whereby the beams may be adjusted vertically on the posts, and means for rocking said shaft to simultaneously raise and lower all of the beams.

7. In a cultivator, the combination of a plurality of vertically disposed posts, a cultivator beam slidably associated with each of said posts, a shaft, a plurality of sector members mounted on said shaft, an operating lever pivoted on each sector member, connections between said levers and said beams whereby the beams may be raised or lowered individually on said posts, and a hand lever fixed to said shaft whereby the shaft may be rotated to simultaneously raise or lower all of said beams.

8. In a cultivator, the combination of a pair of vertically disposed journal sleeves, wheel axles having vertically disposed portions journaled in said sleeves, a wheel mounted on each of said axles, an arm projecting forwardly from the upper end of each of said vertical portions, a transversely disposed shaft pivotally connected with the extremity of each of said arms, a plurality of posts suspended from said shaft, beams slidably and pivotally associated with said posts, sector members secured on said shaft above each of said posts, adjusting levers pivoted on said sector members, links connecting said levers with said beams whereby the beams may be adjusted vertically on said posts by means of said levers, and a raising and lowering lever fixed to said shaft whereby the shaft may be rotated to simultaneously raise and lower all of the beams.

9. In a cultivator, the combination of a pair of wheels mounted to swing about vertical axes, a transversely disposed longitudinally movable shaft pivotally connected with the wheels whereby the wheels are maintained in parallel relation, a plurality of posts sleeved on and suspended from said shaft, a beam slidably and pivotally associated with each of said posts, means for adjustably maintaining said posts in predetermined relation on said shaft, means for moving said shaft longitudinally to angle the wheels and simultaneously shift the beams laterally, and means for raising and lowering said beams on the posts.

10. In a cultivator, the combination of a pair of supporting wheels, a transversely disposed shaft pivotally connected with each of said wheels, a plurality of posts sleeved on said shaft, a beam associated with each of said posts, means for adjusting all of said posts simultaneously on the shaft to vary the distance between the beams of each pair, adjusting levers whereby the beams may be individually adjusted vertically on the posts, and a single raising and lowering lever connected with said shaft to rotate the shaft whereby all of the beams are raised or lowered simultaneously.

11. In a cultivator, the combination of a frame, supporting wheels mounted at each side thereof, arms fixed with respect to the wheel axles projecting forwardly in parallelism from the vertical pivots about which the wheels swing, a shaft rotatably and pivotally connected with the extremities of said arms, posts sleeved on said shaft, a beam slidably associated with each of said posts, means carried by said shaft whereby the posts may be simultaneously adjusted longitudinally of the shaft, means including sector members non-rotatably mounted on the shaft and adjusting levers pivoted on said sector members for raising and lowering said beams, a sector member fixed with respect to the frame, and a raising and lowering lever fixed on said shaft and adapted to coöperate with said last mentioned sector member whereby the shaft may be rotated to simultaneously raise or lower all of said beams.

12. In a cultivator, the combination of a frame, a shaft extending transversely of said frame, posts sleeved on said shaft, beams slidably associated with said posts, means including a sector member and a lever carried by said shaft whereby the posts may be adjusted longitudinally on said shaft, and means including a fixed notched member, and a lever fixed on said shaft whereby the shaft may be rotated to raise or lower said beams.

13. In a cultivator, the combination of a frame, a shaft extending transversely thereof, posts slidably sleeved on said shaft, manually controlled means carried by the shaft whereby the positions of the posts may be adjusted longitudinally of the shaft, and means for shifting said shaft longitudinally whereby the posts are moved with the shaft without varying their relative positions on the shaft.

14. In a cultivator, the combination of a frame, a shaft mounted to move longitudinally and to rotate with respect to the frame, a plurality of posts loosely suspended from said shaft, means for maintaining said posts in vertical position, a beam sleeved to each of said posts, means for simultaneously varying the positions of the posts longitudinally of the shaft and adapted to retain said posts in their adjusted position, means for moving said shaft longitudinally, means movable with respect to the shaft for raising and lowering said beams individually, and means for rotating the shaft to raise and lower said beams collectively.

15. In a cultivator, the combination of a frame, a shaft movable longitudinally and rotatable with respect to the frame, beams supported from said shaft, means for moving said shaft longitudinally to shift the beams laterally, a sector member sleeved to said shaft and slidably engaged with said frame, and means including a lever fixed on said shaft and coöperating with said sector member whereby said shaft may be rotated to raise or lower the beams.

16. In a cultivator, the combination of a frame, a longitudinally movable and rotatable shaft, a sector member non-rotatable but slidably connected with said shaft, a post loosely sleeved on said shaft adjacent to said sector member, a beam sleeved on said post, means for adjusting said post and sector member longitudinally of the shaft, means including a manually controlled lever pivoted on said sector member and adapted to coöperate therewith, and a link connecting said lever and said beam whereby said beam may be adjusted vertically on said post.

17. In a cultivator, the combination of a longitudinally and rotatably movable shaft, a plurality of posts sleeved to said shaft, a sector member loosely sleeved on said shaft but fixed against movement longitudinally of the shaft, a lever pivoted to the shaft and adapted to lockingly engage with said sector member, and links connecting said lever with each of said posts whereby upon movement of the lever the posts will be simultaneously adjusted longitudinally of the shaft.

18. In a cultivator, the combination of a frame, a shaft mounted to move longitudinally and rotatively with respect to said frame, a sector member pivoted on said shaft but held against movement longitudinally of the shaft, said sector member having a sliding engagement with the frame to prevent rotation of the sector member with the shaft, a plurality of posts loosely suspended from said shaft, a pivoted lever adapted to lockingly engage with said sector member, and means connecting said lever with each of said posts whereby adjusting movement of said lever with respect to the sector member will simultaneously adjust all of said posts longitudinally of the shaft.

19. In a cultivator, the combination of a frame including a transverse member and a pair of poles rigidly connected therewith, a pair of wheels mounted at each side of said frame to swing about vertical axes, a rotatable and longitudinally movable shaft connected with each of said wheels whereby the wheels are maintained in parallel relation, a plurality of beams supported from said shaft, means for adjusting the position of the beams longitudinally of the shaft, means for moving the shaft longitudinally to shift the beams laterally and simultaneously angle the wheels, means movable with respect to the shaft for raising and lowering the beams individually, and means for imparting a rotative movement to said shaft for simultaneously raising or lowering said beams collectively.

20. In a cultivator, the combination of a vertical slideway, cultivator beams mounted at their forward ends on said slideways to move vertically thereon and means for moving the cultivator beams up and down on said slideways.

21. In a cultivator, the combination of a transversely disposed shaft, cultivator-beam supporting means slidably mounted to move axially of the shaft, cultivator beams mounted on said supporting means to move vertically thereon, means operative between the cultivator beams and the shaft whereby upon rocking the shaft the cultivator beams will be moved vertically, and means for sliding said supporting means axially.

22. In a cultivator, the combination of a transversely disposed shaft, beam-supporting means mounted on the shaft, a cultivator beam mounted on said beam-supporting means to move vertically thereon and means operative between said shaft and the cultivator beam whereby the shaft may be rocked to raise and lower the beam.

LEWIS E. WATERMAN.

Witnesses:
W. R. BAXTER,
JOHN A. GARVER.